(12) United States Patent
Gerlach

(10) Patent No.: US 8,943,851 B2
(45) Date of Patent: Feb. 3, 2015

(54) EVAPORATIVE COOLER INCLUDING ONE OR MORE ROTATING COOLER LOUVERS

(75) Inventor: David W. Gerlach, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 385 days.

(21) Appl. No.: 13/399,641

(22) Filed: Feb. 17, 2012

(65) Prior Publication Data

US 2013/0213076 A1 Aug. 22, 2013

(51) Int. Cl.
*F25D 5/00* (2006.01)

(52) U.S. Cl.
USPC ................................. 62/314; 62/186; 62/304

(58) Field of Classification Search
CPC .......... Y02B 30/545; F28D 5/00; F25D 7/00; F25D 2331/806; F24F 6/04
USPC ............ 62/314, 315, 186, 271, 304; 261/102, 261/104
See application file for complete search history.

(56) References Cited

U.S. PATENT DOCUMENTS

| | | | |
|---|---|---|---|
| 2,177,185 A | 10/1939 | Meyer | |
| 2,300,580 A * | 11/1942 | Loprich | 261/30 |
| 3,290,866 A * | 12/1966 | Schonrock | 96/265 |
| 3,775,950 A | 12/1973 | Hallamore | |
| 4,308,222 A | 12/1981 | Goettel et al. | |
| 4,505,327 A | 3/1985 | Angle et al. | |
| 4,752,419 A * | 6/1988 | Sperr et al. | 261/29 |
| 4,803,849 A | 2/1989 | Diaz | |
| 4,827,733 A * | 5/1989 | Dinh | 62/305 |
| 4,833,896 A | 5/1989 | Carlson | |
| 4,851,162 A * | 7/1989 | Sperr et al. | 261/105 |
| 4,935,169 A | 6/1990 | Ernst | |
| 4,977,756 A * | 12/1990 | Brock | 62/314 |
| 5,042,270 A * | 8/1991 | Sanchez | 62/314 |
| 6,178,767 B1 | 1/2001 | Pravda | |
| 6,385,985 B1 | 5/2002 | Bussjager et al. | |
| 2005/0046050 A1 | 3/2005 | Palmer et al. | |
| 2010/0058794 A1 | 3/2010 | Bhatti et al. | |
| 2011/0024092 A1 | 2/2011 | Gerlach | |

FOREIGN PATENT DOCUMENTS

| | | |
|---|---|---|
| EP | 0257715 | 3/1988 |
| FR | 2641853 | 7/1990 |
| WO | 2005073642 | 8/2005 |

OTHER PUBLICATIONS

International search report for PCT/US2012/070117 dated Jul. 10, 2013.

* cited by examiner

*Primary Examiner* — Melvin Jones
(74) *Attorney, Agent, or Firm* — O'Shea Getz P.C.

(57) ABSTRACT

An evaporative cooler may include an evaporative cooler housing with a duct extending therethrough, a plurality of cooler louvers with respective porous evaporative cooler pads, and a working fluid source conduit. The cooler louvers are arranged within the duct and rotatably connected to the cooler housing along respective louver axes. The source conduit provides an evaporative cooler working fluid to the cooler pads during at least one mode of operation.

20 Claims, 3 Drawing Sheets

US 8,943,851 B2

EVAPORATIVE COOLER INCLUDING ONE OR MORE ROTATING COOLER LOUVERS

This invention was made with government support under Contract No. DE-EE0002738 awarded by the United States Department of Energy. The government may have certain rights in the invention.

BACKGROUND OF THE INVENTION

1. Technical Field

The present invention relates generally to a heat exchange system and, in particular, to an evaporative cooler.

2. Background Information

A typical evaporative cooler may include an evaporative cooler pad housed within a cooler duct. During cooler operation, water is directed through the cooler pad, and air is directed through the cooler duct. The water may evaporate into the air as the air passes through the cooler pad. Heat energy from the air is absorbed by heat of vaporization of the evaporating water, thereby cooling the air.

Scale may form on the cooler pad where the water in at least a portion of the cooler pad completely evaporates. Such scale is formed, for example, where contaminants such as minerals in the water collect on the cooler pad as the water evaporates. The scale may increase pressure drop across the cooler pad and decrease the efficiency of the evaporative cooler. To prevent the formation of scale, therefore, the water flow rate through the evaporative cooler is typically maintained at a relatively high value during cooler operation.

Water may be a scarce and highly regulated commodity in many regions of the world. A typical evaporative cooler, however, is not well suited for conserving water since such a cooler is operated at a relatively high water flow rate to prevent the formation of scale.

SUMMARY OF THE DISCLOSURE

According to a first aspect of the invention, an evaporative cooler includes an evaporative cooler housing with a duct extending therethrough, a plurality of cooler louvers with respective porous evaporative cooler pads, and a working fluid source conduit. The cooler louvers are arranged within the duct and rotatably connected to the cooler housing along respective louver axes. The source conduit provides an evaporative cooler working fluid to the cooler pads during at least one mode of operation.

According to a second aspect of the invention, a system that utilizes an evaporative cooler working fluid includes an evaporative cooler and a thermodynamic system. The evaporative cooler includes a duct, a plurality of cooler louvers with respective porous evaporative cooler pads, and a working fluid source conduit. The duct directs gas through the evaporative cooler from a duct inlet to a duct outlet. The cooler louvers are arranged within the duct and rotate along respective louver axes. The source conduit provides the working fluid to the cooler pads during at least one mode of operation. The thermodynamic system receives the gas from the duct outlet.

The foregoing features and the operation of the invention will become more apparent in light of the following description and the accompanying drawings.

DETAILED DESCRIPTION OF THE INVENTION

Figure 1:
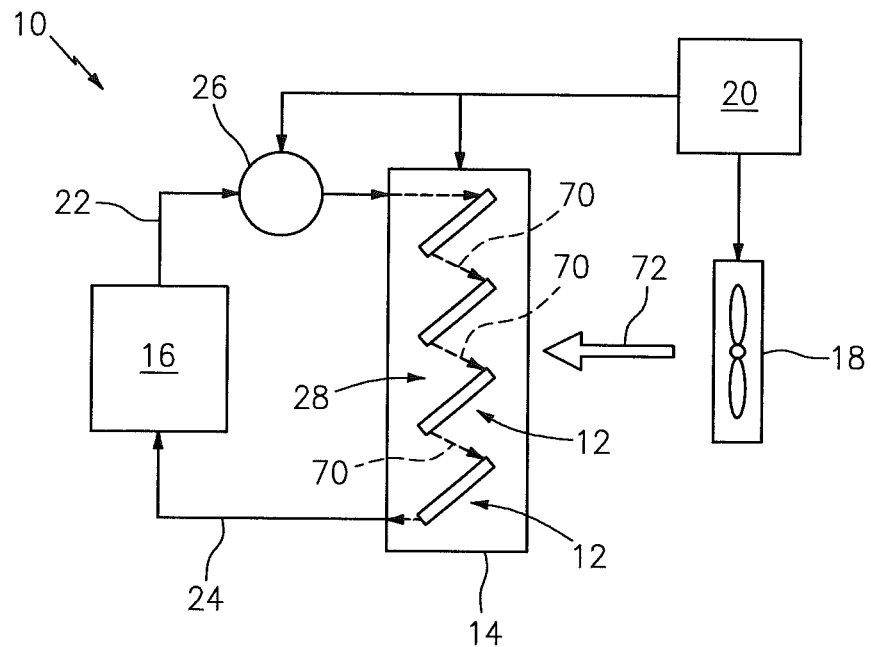
FIG. 1 is a block diagram illustration of an evaporative cooler.

FIG. 1 is a block diagram illustration of an evaporative cooler 10. The evaporative cooler 10 may include one or more rotating cooler louvers 12 arranged (e.g., stacked) within an evaporative cooler housing 14, a working fluid reservoir 16 (e.g., a tank), a fan 18, and a controller 20. The cooler louvers 12 may be fluidly connected to the reservoir 16 through a working fluid source conduit 22 and a working fluid return conduit 24. The evaporative cooler 10 may also include a working fluid flow regulator 26 (e.g., one or more pumps and/or one or more valves) connected, for example, in line with the source conduit 22 between the reservoir 16 and the cooler louvers 12.

Figure 2:
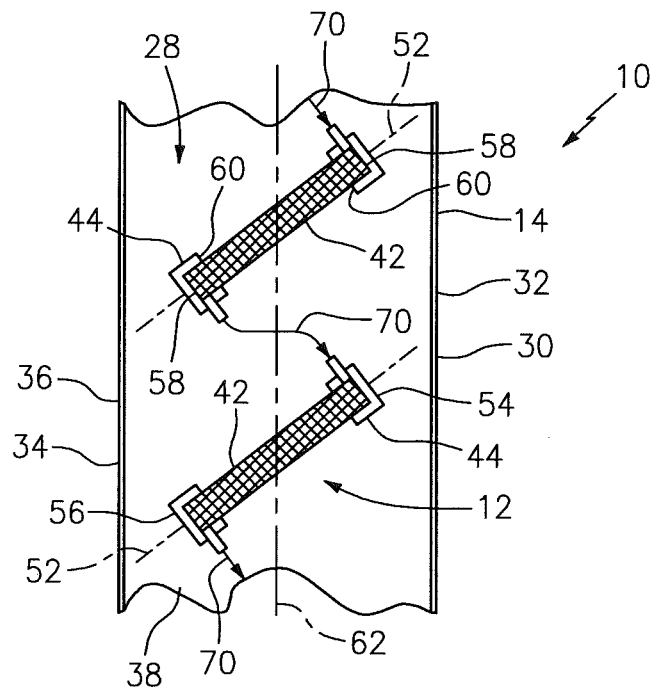
FIG. 2 is a cross-sectional illustration of a plurality of rotating cooler louvers arranged within a portion of an evaporative cooler housing.
Figure 3:
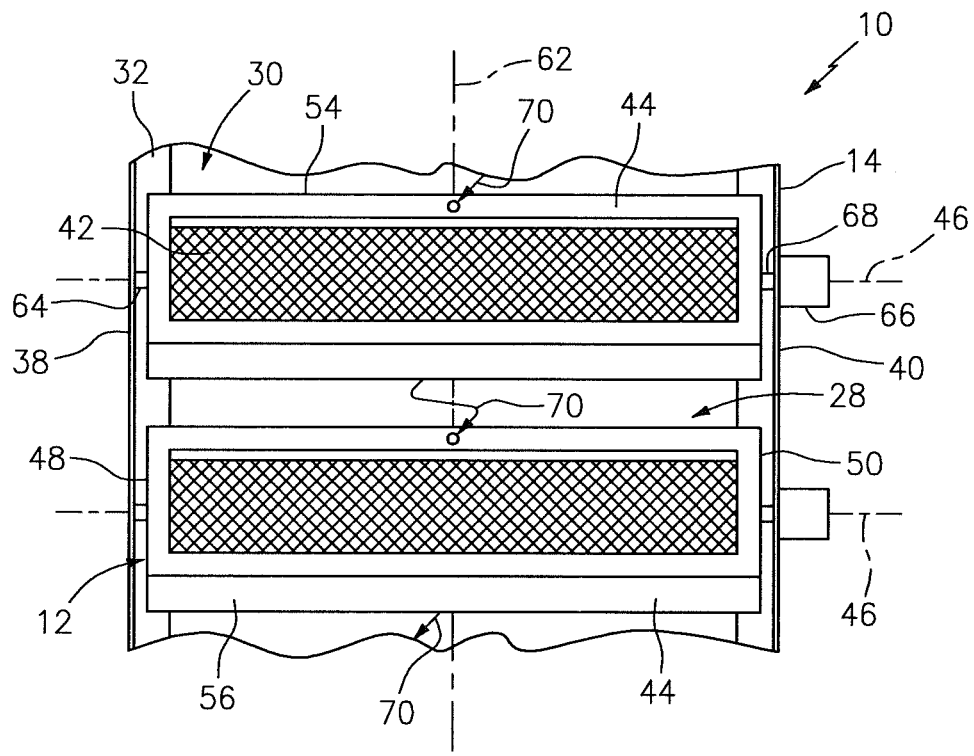
FIG. 3 is a front view illustration of the cooler louvers and the cooler housing illustrated in FIG. 2.

Referring to FIGS. 2 and 3, the cooler housing 14 includes a cooler duct 28 that extends longitudinally between a duct inlet 30 in a first housing endwall 32 and a duct outlet 34 in a second housing endwall 36. The duct 28 also extends laterally between a first housing sidewall 38 and a second housing sidewall 40. The first housing sidewall 38 and the second housing sidewall 40 each extend longitudinally between the first housing endwall 32 and the second housing endwall 36.

Each cooler louver 12 includes a porous (e.g., honey comb) evaporative cooler pad 42 mounted to a louver frame 44. The cooler pad 42 may include one or more apertured (e.g., perforated) layers of cellulosic fibrous material and/or polymeric material. Examples of a cellulosic fibrous material may include wood wool, Kraft paper, etc. Examples of a polymeric material may include thermosetting resin, thermoplastic resin, etc. Examples of a cellulosic fibrous and polymeric material may include resin (e.g., melamine) impregnated paper, etc. Alternatively, the cooler pad 42 may include one or more porous layers of ceramic material or glass material (e.g., glass wool). The present invention, however, is not intended to be limited to the foregoing cooler pad configurations and/or materials.

The louver frame 44 extends along a lateral first louver axis 46 between a first frame sidewall 48 and a second frame sidewall 50. The louver frame 44 also extends along a second louver axis 52 between a third frame sidewall 54 and a fourth frame sidewall 56. The third frame sidewall 54 and the fourth frame sidewall 56 each extend laterally between the first frame sidewall 48 and the second frame sidewall 50. One or more of the frame sidewalls (e.g., 54 and 56) may each include a channel 58 extending along an inner sidewall edge 60 in which the cooler pad 42 may be seated.

The cooler louvers 12 may be serially arranged within the duct 28 along a (e.g., vertical) housing axis 62 that is, for example, substantially perpendicular to the first louver axes 46. Each cooler louver 12 is rotatably connected to the cooler housing 14 along a respective one of the first louver axes 46. The first frame sidewalls 48, for example, may be rotatably connected to the first housing sidewall 38 by respective first louver axles 64. The second frame sidewalls 50, for example, may be rotatably connected to one or more actuators 66 (e.g., pneumatic motors, electric step motors, hand cranks, etc.) on the second housing sidewall 40 by respective second louver axles 68. The fourth frame sidewall 56 of each cooler louver 12 may be fluidly connected to the third frame sidewall 54 of an adjacent (e.g., downstream) cooler louver 12 through a conduit 70 (e.g., flexible tubing), a wick, etc.

Referring to FIG. 1, the controller 20 may be implemented using hardware, software, or a combination thereof. The controller hardware may include one or more processors, memory, analog and/or digital circuitry, etc. The controller 20 is in signal communication (e.g., hardwired or wirelessly connected) with the actuators 66 (see FIG. 4), the fan 18, the flow regulator 26 and various sensors.

Referring to FIGS. 1-3, the evaporative cooler 10 may be operated in a plurality of different modes of operation by controlling one or more evaporative cooler parameters. Examples of evaporative cooler parameters may include (i) angular orientation of one or more of the cooler louvers 12 about the first louver axes 46, (ii) flow rate of gas 72 (e.g., air) directed through the duct 28 by the fan 18, and/or (iii) flow rate of an evaporative cooler working fluid (e.g., water) directed through the cooler louvers 12 by the flow regulator 26. The evaporative cooler parameters may be controlled by communicating one or more commands from the controller 20 to one or more of the actuators 66, the fan 18 and/or the flow regulator 26.

Figure 4:
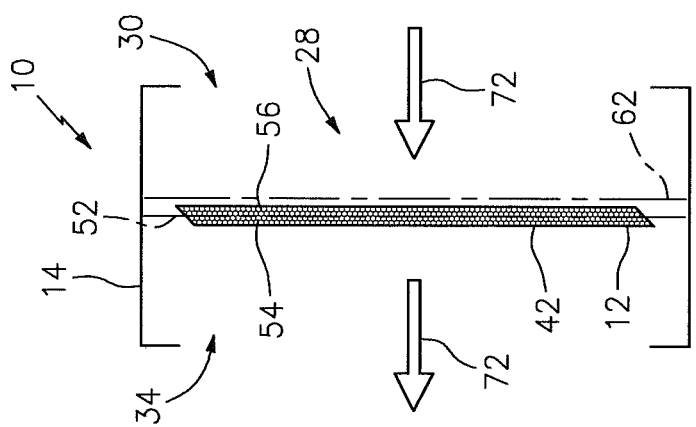
FIG. 4 is a cross-sectional illustration of an evaporative cooler during a first mode of operation.

FIG. 4 is a cross-sectional illustration of the evaporative cooler 10 during a first mode of operation. Referring to FIGS. 1, 3 and 4, in this mode of operation, the actuators 66 rotate one or more of the cooler louvers 12 to a first angular (e.g., closed) orientation where, for example, the second louver axes 52 are substantially parallel to the housing axis 62. The fourth frame sidewall 56 of each cooler louver 12 may be abutted against the third frame sidewall 54 of an adjacent downstream cooler louver 12. The flow regulator 26 may direct the working fluid from the source conduit 22 through the cooler pads 42 at a first working fluid flow rate. The gas 72 is directed substantially through the cooler pads 42 in the duct 28, and is subject to a first pressure drop between the duct inlet 30 and the duct outlet 34. At least some of the working fluid may evaporate as the gas 72 passes through the cooler pads 42. A first quantity of heat energy from the gas 72 may be absorbed by heat of vaporization of the evaporating working fluid, thereby lowering the temperature of the gas 72. In this manner, the evaporative cooler 10 may be utilized to substantially cool the gas 72 flowing through the duct 28 during the first mode of operation.

Figure 5:
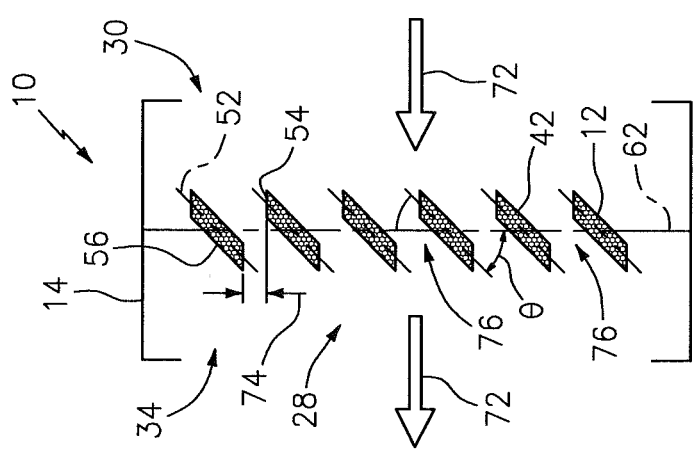
FIG. 5 is a cross-sectional illustration of an evaporative cooler during a second mode of operation.

FIG. 5 is a cross-sectional illustration of the evaporative cooler 10 during a second mode of operation. Referring to FIGS. 1, 3 and 5, in this mode of operation, the actuators 66 rotate one or more of the cooler louvers 12 to a second angular (e.g., semi-open) orientation where, for example, the second louver axes 52 are angularly offset from the housing axis 62 by an offset angle θ (e.g., about forty five degrees). The offset angle θ may be between zero and ninety degrees (0°<θ<90°). The fourth frame sidewall 56 of each cooler louver 12 is spatially separated from the third frame sidewall 54 of the adjacent (e.g., downstream) cooler louver 12 by a first distance 74 along the housing axis 62. The flow regulator 26 may direct the working fluid from the source conduit 22 through the cooler pads 42 at a second working fluid flow rate. The gas 72 is directed through and around the cooler pads 42 in the duct 28, and is subject to a second pressure drop between the duct inlet 30 and the duct outlet 34. The second pressure drop may be less than the first pressure drop since a portion of the gas 72 may pass substantially unrestricted through the spatial gaps 76 between the adjacent cooler louvers 12. Thus, the second working fluid flow rate may be less than the first working fluid flow rate since the unrestricted portion of the gas 72 has relatively little or no interaction with the working fluid in the cooler pads 42. At least some of the working fluid may evaporate as the other portion of the gas 72 passes through the cooler pads 42. A second quantity of heat energy from that portion of the gas 72 may be absorbed by the heat of vaporization of the evaporating working fluid. In this manner, the evaporative cooler 10 may be utilized to partially cool the gas 72 flowing through the duct 28 during the second mode of operation.

Figure 6:
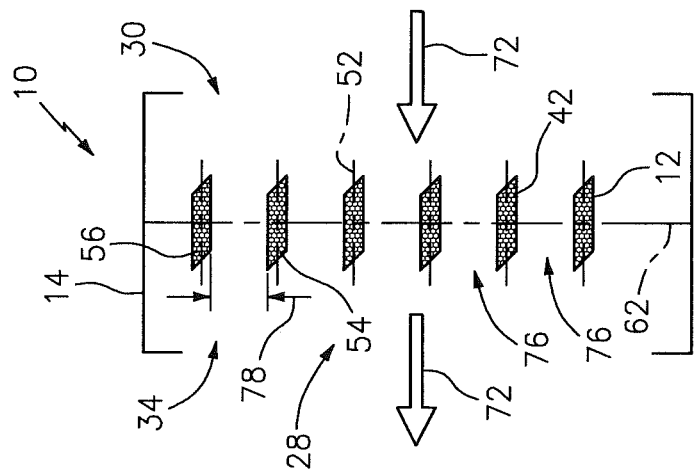
FIG. 6 is a cross-sectional illustration of an evaporative cooler during a third mode of operation.

FIG. 6 is a cross-sectional illustration of the evaporative cooler 10 during a third mode of operation. Referring to FIGS. 1, 3 and 6, in this mode of operation, the actuators 66 rotate one or more of the cooler louvers 12 to a third angular (e.g., open) orientation where, for example, the second louver axes 52 are substantially perpendicular to the housing axis 62. The fourth frame sidewall 56 of each cooler louver 12 is spatially separated from the third frame sidewall 54 of the adjacent (e.g., downstream) cooler louver 12 by a second distance 78 along the housing axis 62 that is greater than the first distance 74 (see FIG. 5). The flow regulator 26 may, for example, prevent the working fluid from flowing through the source conduit 22 to the cooler pads 42. The gas 72 is directed by the fan 18 substantially around the cooler pads 42 in the duct 28, and is subject to a third pressure drop between the duct inlet 30 and the duct outlet 34. The third pressure drop may be less than the second pressure drop since the gas 72 may pass substantially unrestricted through the spatial gaps 76 between the adjacent cooler louvers 12. In this manner, the gas 72 may pass through the duct 28, for example, without being cooled.

The mode of operation in which the evaporative cooler 10 is operated may be selected by the controller 20 based on one or more control parameters. Some examples of control parameters may include ambient conditions such as temperature of the gas 72, temperature of the working fluid, etc. Other examples of control parameters may include evaporation rate of the working fluid from the cooler pads 42, quantity of the working fluid within the reservoir 16, environmental and/or monetary costs to replenish the working fluid within the reservoir 16, environmental and/or monetary costs of energy consumed by a thermodynamic system, environmental and/or monetary costs of energy produced by a thermodynamic system, etc. The evaporative cooler 10 may be operated in the first mode of operation illustrated in FIG. 4, for example, where the temperature of the gas 72 is relatively high and the cost to replenish the working fluid within the reservoir 16 is relatively low. The evaporative cooler 10 may be operated in the second mode of operation illustrated in FIG. 5, for example, where the temperature of the gas 72 is relatively high and the cost to replenish the working fluid within the reservoir 16 is relatively high. The evaporative cooler 10 may be operated in the third mode of operation illustrated in FIG. 6, for example, where the temperature of the gas 72 is relatively low and the cost to replenish the working fluid within the reservoir 16 is relatively high. In this manner, the evaporative cooler 10 may be operated to balance cooling of the gas 72 flowing through the duct 28 with reducing utilization (e.g., consumption) of the working fluid.

In some embodiments, the cooler pads 42 may be clamped to a side of the louver frame 44 with a spring and/or bolts.

In some embodiments, a pump may be fluidly connected between adjacent cooler louvers 12 in order to pump working fluid collected in a (e.g., bottom) channel 58 of a respective louver frame 44 to the adjacent louver frame 44 for distribution into a respective cooler pad 42. In other embodiments, the working fluid may drip from one louver frame 44 onto an adjacent louver frame 44 and/or cooler pad 42.

In alternate embodiments, the cooler louvers 12 may be connected to a single actuator through, for example, a gear train, one or more chains and sprockets, one or more belts and pulleys, etc.

Figure 7:
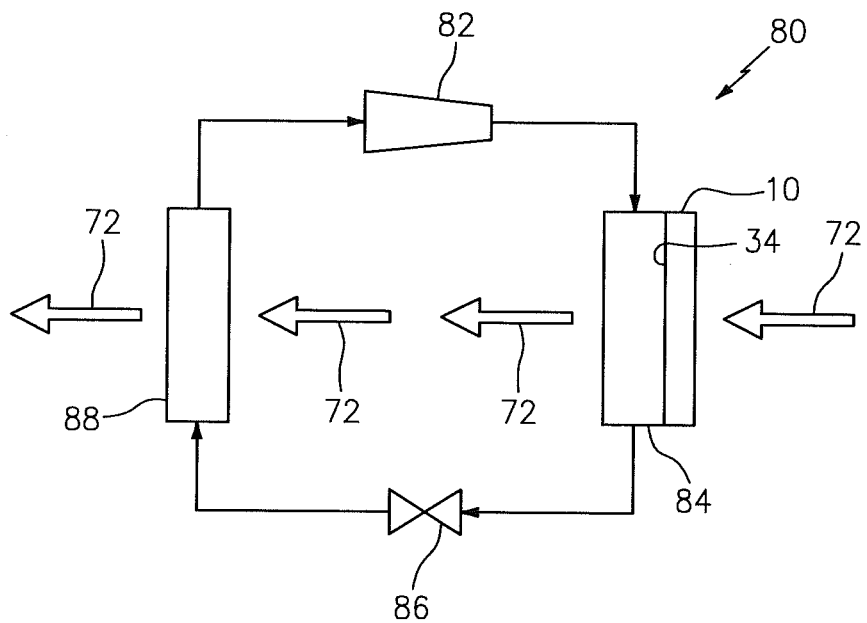
FIG. 7 is a block diagram illustration of a thermodynamic system configured with an evaporative cooler.

FIG. 7 is a block diagram illustration of a thermodynamic system 80 configured with the evaporative cooler 10. The thermodynamic system 80 may be configured as a heat exchange system such as, for example, a heat pump system, an air conditioning system or a heat engine system (e.g., a Rankine power cycle system). The heat exchange system may include a compressor 82, a condenser 84, a working fluid (e.g., refrigerant) flow regulator 86 and an evaporator 88 that may be sequentially arranged in a closed loop circuit. The duct outlet 34 of the evaporative cooler 10 is arranged to provide the gas 72 to the condenser. In this manner, the evaporative cooler 10 may function as a pre-cooler for the condenser 84 during, for example, the first and second modes of operation.

In alternative embodiments, the thermodynamic system 80 may be configured as a combustion engine such as, for example, a gas turbine engine power plant. In such embodiments, the duct outlet 34 may be arranged to provide the gas to a combustion engine gas (e.g., air) intake.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. An evaporative cooler, comprising:
    an evaporative cooler housing comprising a duct extending therethrough;
    a plurality of porous evaporative cooler pads;
    a plurality of cooler louvers arranged within the duct and rotatably connected to the cooler housing along respective louver axes, each of the plurality of cooler louvers comprising one of the cooler pads; and
    a working fluid source conduit that provides an evaporative cooler working fluid to the cooler pads during at least one mode of operation.

2. The evaporative cooler of claim 1, wherein at least a first of the plurality of cooler louvers rotates about a respective one of the louver axes between a first angular orientation during a first mode of operation and a second angular orientation during a second mode of operation.

3. The evaporative cooler of claim 2, wherein the duct is subject to a first pressure drop during the first mode of operation, and the duct is subject to a second pressure drop that is greater than the first pressure drop during the second mode of operation.

4. The evaporative cooler of claim 2, wherein the first of the plurality of cooler louvers is spatially separated from a second of the plurality of cooler louvers by a first distance during the first mode of operation, and the first of the plurality of cooler louvers is spatially separated from the second of the plurality of cooler louvers by a second distance that is less than the first distance during the second mode of operation.

5. The evaporative cooler of claim 2, further comprising a working fluid flow regulator fluidly connected to the source conduit, wherein the flow regulator directs the working fluid through the source conduit to the cooler pads at a first flow rate during the first mode of operation, and the flow regulator directs the working fluid through the source conduit to the cooler pads at a second flow rate that is greater than the first flow rate during the second mode of operation.

6. The evaporative cooler of claim 2, further comprising a working fluid flow regulator fluidly connected to the source conduit, wherein the flow regulator prevents the working fluid from flowing through the source conduit during the first mode of operation, and the flow regulator directs the working fluid through the source conduit to the cooler pads during the second mode of operation.

7. The evaporative cooler of claim 1, wherein the louver axes are substantially parallel.

8. The evaporative cooler of claim 1, wherein the cooler louvers are serially arranged along a housing axis that is substantially perpendicular to the lover axes.

9. The evaporative cooler of claim 1, wherein each of the cooler pads is mounted in a louver frame that extends along a respective one of the louver axes between a first axle rotatably connected to a first housing side and a second axle rotatably connected to a second housing side.

10. The evaporative cooler of claim 9, wherein the louver frame of a first of the plurality of cooler louvers collects the working fluid flowing through the cooler pad of the first of the plurality of cooler louvers, and provides the collected working fluid to the louver frame of a second of the plurality of cooler louvers.

11. The evaporative cooler of claim 10, wherein the first of the plurality of cooler louvers provides the collected working fluid to the second of the plurality of cooler louvers through one of a conduit and a wick.

12. The evaporative cooler of claim 9, further comprising an actuator connected to the first axle of a first of the plurality of cooler louvers, wherein the actuator rotates the first of the plurality of cooler louvers about a respective one of the louver axes.

13. The evaporative cooler of claim 1, wherein at least one of the cooler pads comprises at least one of a cellulosic material and a polymeric material.

14. A system that utilizes an evaporative cooler working fluid, comprising:
    an evaporative cooler comprising
        a duct that directs gas through the evaporative cooler from a duct inlet to a duct outlet;
        a plurality of porous evaporative cooler pads;
        a plurality of cooler louvers that are arranged within the duct and rotate along respective louver axes, each of the plurality of cooler louvers comprising one of the cooler pads; and
        a working fluid source conduit that provides the working fluid to the cooler pads during at least one mode of operation; and
    a thermodynamic system that receives the gas from the duct outlet.

15. The system of claim 14, wherein the thermodynamic system comprises a condenser that receives the gas from the duct outlet, and is configured as one of a heat pump system, an air conditioning system, and a heat engine system.

16. The system of claim 14, wherein the thermodynamic system comprises an engine inlet that receives the gas from the duct outlet, and is configured as a gas turbine engine power plant.

17. The system of claim 14, wherein at least a first of the plurality of cooler louvers rotates about a respective one of the louver axes between a first angular orientation during a first mode of operation and a second angular orientation during a second mode of operation.

18. The system of claim 17, wherein the duct is subject to a first pressure drop during the first mode of operation, and the duct is subject to a second pressure drop that is greater than the first pressure drop during the second mode of operation.

19. The system of claim 17, wherein the first of the plurality of cooler louvers is spatially separated from a second of the plurality of cooler louvers by a first distance during the first mode of operation, and the first of the plurality of cooler louvers is spatially separated from the second of the plurality of cooler louvers by a second distance that is less than the first distance during the second mode of operation.

20. The system of claim 17, further comprising a working fluid flow regulator fluidly connected to the source conduit, wherein the flow regulator directs the working fluid through the source conduit to the cooler pads at a first flow rate during the first mode of operation, and the flow regulator directs the working fluid through the source conduit to the cooler pads at a second flow rate that is greater than the first flow rate during the second mode of operation.

\* \* \* \* \*